No. 875,957. PATENTED JAN. 7, 1908.
O. SAUGSTAD.
THERMOSTAT.
APPLICATION FILED OCT. 8, 1903.
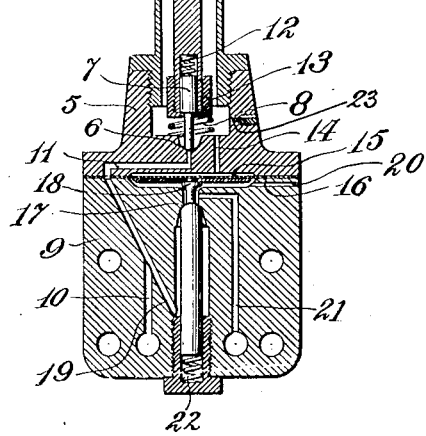

UNITED STATES PATENT OFFICE.

OLAF SAUGSTAD, OF PLAINFIELD, NEW JERSEY, ASSIGNOR TO DAVIS & ROESCH TEMPERATURE CONTROLLING COMPANY, OF NEW YORK, N. Y., A CORPORATION OF NEW JERSEY.

THERMOSTAT.

No. 875,957.  Specification of Letters Patent.  Patented Jan. 7, 1908.

Application filed October 8, 1903. Serial No. 176,225.

*To all whom it may concern:*

Be it known that I, OLAF SAUGSTAD, a citizen of the United States of America, and resident of Plainfield, county of Union, State of New Jersey, have invented certain new and useful Improvements in Thermostats, of which the following is a specification, reference being had to the accompanying drawings, forming a part thereof.

My invention relates to improvements in thermostats, and particularly to improvements in thermostats adapted for use as temperature regulators and which may be connected with a heating system.

My invention consists principally in the employment, in a thermostat employing two thermostatic members connected together at one end, and provided the one with a valve seat and the other with a valve directly supported by the member carrying it, of a relief spring between the main valve and the thermostatic member carrying it. In this form of thermostat the valve is closed by contraction or expansion of the parts as the case may be, and compensation must be made for continued relative contraction of the parts in the direction of closing the valve after the valve is closed, otherwise the parts will be severely strained or broken.

In my present invention I carry the valve directly by one of the thermostatic members, but instead of securing the same rigidly thereto I interpose between the said valve and the thermostatic member a relief spring, said spring having sufficient tension to hold the valve closed to its seat when the thermostat is operating to close the valve, but arranged to give sufficiently, to afford a relief for the parts, after the valve has been securely seated, and relative contraction or expansion of the members is continued in the same direction.

My invention further consists in certain novel details of construction and combination of parts as will hereinafter more fully appear.

I will now proceed to describe a thermostat embodying my invention, and will then point out the novel features in claims.

In the drawings: Figure 1 is a view in central vertical longitudinal section of a thermostat embodying my invention. Fig. 2 is a similar view on an enlarged scale of the valve carried by the thermostatic member, and a portion of the thermostatic member carrying it, together with the relief spring employed. Fig. 3 is a similar view on an enlarged scale of portions of the casing, showing a modified arrangement of ports and passages.

The thermostat herein comprises an outer tube or shell 1 and an inner bar 2. The tube or shell 1 and bar 2 are composed of materials having different co-efficients of expansion, the outer tube being for instance of brass, which has a relatively high co-efficient of expansion, while the inner bar 2 may be of iron, which has a relatively low co-efficient of expansion. The upper end of the tube or shell 1 is closed by a cap 3, and an adjusting screw 4, mounted therein, engages the upper end of the bar 2, and maintains the two members 1 and 2 unyieldingly against longitudinal relative movement in one direction.

At its lower end the tube or shell 1 is secured to a casing 5, said casing having therein a valve seat 6. The bar 2 carries at its lower end a valve 7, adapted to co-act with the valve seat 6. A spring 8, arranged in the casing 5, supports the bar 2 and holds same firmly up against the adjusting screw 4. The casing 5 is supported upon a base 9, said base provided with an inlet channel 10, arranged to connect with a source of fluid pressure supply. The channel 10 connects with a port or passage 11 in the casing 5, said port or passage leading to the valve 7 and by which it is controlled. Expansion of the thermostatic member 1, caused by the temperature rising above a predetermined point, will cause the valve 7 to be lifted from its seat to permit passage of motive fluid past same, while contraction of the tube 1 below such predetermined point will close the said valve and prevent further passage of motive fluid therethrough.

A restricted discharge 23 is provided, for permitting gradual exhaust of the motive fluid after the valve has closed and further admission has thereby been cut off. The usual adjusting plug may be fitted to this discharge as shown.

In Fig. 3 I have shown in detail a modification in which the inlet passage 11 connects with the rear of the said valve instead of the front thereof. In either case closing of the valve will prevent passage of motive fluid therethrough, while opening same will permit such passage. After the tube 1 has contracted sufficiently to close the valve some provision must be made for compensating for further contraction, otherwise the parts are liable to be badly strained or broken. For this purpose I have interposed a spring 12 between the valve 7 and the end of the rod 2 carrying it, such spring having sufficient tension to keep the valve firmly closed when in its closed position, but arranged to act as a relief spring when further contraction of the tube 1 causes the bar 2 to be forced nearer the valve seat 6. The valve 7 is preferably shouldered and retained in its position by means of a cap 13, the spring 12 causing the shouldered portion of the valve to engage the cap 13 when the valve is lifted away from its seat. The spring 8 supports the bar so as to lift the valve from its seat when the tube 1 expands sufficiently to permit it. Passage of motive fluid past the valve 7 may be employed for any purpose desired.

In the present device I have shown a connection 14 leading from the discharge side of the valve to a diaphragm chamber 15, arranged between the lower face of the casing 5 and the upper face of the base 9. The diaphragm 16 is arranged in the said diaphragm chamber, and controls in its movements the movements of inlet and exhaust valves 17 and 18, adapted, respectively, to engage the valve seats with which the base 9 is provided.

A branch passage 19 leads from the inlet channel 10 to the rear of the inlet valve 17, and the lower side of the diaphragm chamber 15, into which the discharge valve 18 opens, is open to atmosphere through a discharge port 20. A distributing channel 21 connects with the space between the inlet and exhaust valves, and fluid under pressure, admitted by the valve 17, may pass through said distributing channel to the device to be operated. Exhaust motive fluid from such device will return through said channel to exhaust through the exhaust valve 18 when said valve 18 is opened and the inlet valve 17 is closed. A spring 22, beneath the valve 19, resists downward movement of the diaphragm 16, and the valves 17 and 18, and returns them to their uppermost position when pressure is relieved from the top of said diaphragm.

What I claim is:—

A thermostatic regulating device comprising as its entire structure a single tube and bar one within the other, connected together at one end unyieldingly against movement in one direction, said tube and bar composed of materials having different co-efficients of expansion, the tube carrying at one end, and rigidly secured thereto concentrically thereof, a valve seat, and the bar carrying a light valve piece spring pressed by means of a light spring toward the valve seat, and having means for bodily lifting the valve piece from its seat as the end of the bar carrying same lifts with respect to the valve seat, a casing for supporting said valve seat, tube and bar, a diaphragm in said casing, and inlet and exhaust valves secured to, and operated by movements of, said diaphragm, said regulator being provided with a motive fluid inlet channel in said casing connecting therethrough to the said valve seat and to the said inlet valve, an opening between the opposite side of said valve seat and one side of said diaphragm, a restricted discharge communicating from said opening to the atmosphere, a discharge opening from the other side of said diaphragm to the atmosphere, and a distributing passage between said diaphragm controlled inlet and exhaust valves, substantially as set forth.

OLAF SAUGSTAD.

Witnesses:
C. F. CARRINGTON,
EUGENIA S. HAMM.